United States Patent [19]
Persinotti

[11] Patent Number: 4,578,815
[45] Date of Patent: Mar. 25, 1986

[54] WIDE AREA COVERAGE RADIO COMMUNICATION SYSTEM AND METHOD

[75] Inventor: Gary W. Persinotti, Dallas, Tex.

[73] Assignee: Motorola, Inc., Schaumburg, Ill.

[21] Appl. No.: 559,122

[22] Filed: Dec. 7, 1983

[51] Int. Cl.$^4$ .......................... H04B 7/155; H04B 7/26
[52] U.S. Cl. ........................................ 455/15; 455/17;
455/33; 455/51; 455/56; 455/62
[58] Field of Search ........................ 455/33, 34, 51, 52, 455/54, 56, 62, 17, 15; 179/2 EB

[56] References Cited

U.S. PATENT DOCUMENTS

| | | |
|---|---|---|
| 3,546,391 | 12/1970 | den Hertog . |
| 3,663,762 | 5/1972 | Joel . |
| 3,749,845 | 7/1973 | Fraser . |
| 4,012,597 | 3/1977 | Lynk, Jr. et al. . |
| 4,092,600 | 5/1978 | Zimmermann et al. ............... 455/54 |
| 4,188,582 | 2/1980 | Cannalte et al. . |
| 4,255,814 | 5/1981 | Osborn . |
| 4,281,413 | 7/1981 | Forrest .................................. 455/54 |
| 4,312,070 | 1/1982 | Coombes et al. . |

FOREIGN PATENT DOCUMENTS 1393614 5/1975 United Kingdom .

OTHER PUBLICATIONS

System Design Aspects of a Simulcast Trunked System; Sasuta, Michael; 32nd IEEE Vehicular Technology Conference, May 23-26, 1982.

Primary Examiner—Marc E. Bookbinder
Attorney, Agent, or Firm—Edward M. Roney; Donald B. Southard; Raymond A. Jenski

[57] ABSTRACT

A wide area coverage radio communication system of the type adapted to relay a message substantially simultaneously from a plurality of fixed location sites to a plurality of portable or mobile units includes a plurality of repeaters at each of the sites. Each of the repeaters is arranged to transmit and receive on a respective different frequency duplex pair or channel. Control means at one of the sites senses channel availability at all of the sites and causes one repeater at each of the sites to transmit the message on its respective different frequency. Access to the system by the portable units is provided on a trunked basis through the control means.

26 Claims, 4 Drawing Figures

WIDE AREA COVERAGE RADIO COMMUNICATION SYSTEM AND METHOD

BACKGROUND OF THE INVENTION

Line of sight radio communication over large or wide geographical coverage areas has posed significant problems in the past. Systems of this type generally must make communication possible between mobile or portable equipment which have low power transmitters and which can move in any direction within the wide coverage area. System configurations which have been used to make such communication possible include systems having a centralized fixed-site receiver and high power transmitter and a plurality of remotely located receivers connected by wireline or microwave back to the central site, systems including mobile repeaters which rebroadcast the radio communications, and systems which simultaneously transmit the radio communication or message from multiple fixed sites on the same frequency. Systems of this last type have often been referred to as "simulcast" systems.

Simulcast systems generally include a plurality of radio transmission and reception fixed sites located in spaced apart relation throughout the geographical area to be provided with radio communication coverage. Ideally, the fixed sites are distributed such that areas not covered by one site will be covered by another site. As a result, the sites are distributed to create an overlapping patchwork of individual radio coverage areas which, when taken together, approximates the desired geographic coverage area. The message to be transmitted from each site is conveyed from one site called the master site to each of the other sites by microwave or wireline and subsequently transmitted by all of the sites on the same frequency to be received by all of the mobiles and other portables within the wide coverage area.

Unfortunately, some problems are encountered with such simulcast systems. Because it is virtually impossible to configure the coverage area of each fixed site exactly, overlapping of the individual coverage areas must be allowed to assure complete or total wide area coverage. The coverage area overlapping of simulcast systems causes problems. Because all of the fixed site transmitters transmit on the same frequency, radio frequency carrier beat note interference and demodulated audio phase cancellation can result in the overlapping areas. Correction of these problems is expensive. For example, expensive frequency standards, linear phase microwave multiplex equipment or compensated telephone lines and phase delay equipment are required. The present invention avoids these problems by utilizing a different transmit channel frequency at each of the fixed sites and a trunked access system.

Trunked radio systems are well known. In such systems, a fixed number of duplex radio channels is shared among a large number of potential users. The system through a central controller allocates the radio channels to the users depending on their communication need and deallocates the radio channel upon the completion of a user's transmission. Communication between users and the central controller occurs on a designated link which can be a separate duplex control channel or some form of subaudible, audible, supra-audio, or subcarrier shared radio channel usage.

It is therefore a general object of the present invention to provide a new and improved wide coverage area radio communication system.

It is a further object of the present invention to provide such a system having a plurality of fixed transmission sites and wherein each fixed transmission site is arranged to transmit on a different respective frequency to avoid beat note interference and phase cancellation in overlapping coverage areas.

It is a further object of the invention to provide such a system wherein access of the system is allocated by a trunking system.

It is another object of the present invention to provide a new and improved method of relaying a message substantially simultaneously from a plurality of fixed transmitter sites over a wide geographical area.

It is another object of the invention to provide a method of relaying a message by radio communication from one mobile to at least another mobile over a wide geographical coverage area without requiring special audio conditioning or frequency control standards.

SUMMARY OF THE INVENTION

The invention provides in a two-way communication system of the type adapted to relay a message substantially simultaneously from a plurality of fixed location sites, the improvement comprising radio frequency transmission means at each of the sites arranged for transmitting on a respective different frequency than the transmission frequency of any other of the sites, means for selecting among the plurality of different frequencies at said sites to provide corresponding channels at each of said respective sites, and control means for selecting a given channel and causing at least two of the transmission means to transmit the message substantially simultaneously on the respective different frequencies. In accordance with a preferred embodiment of the present invention, the control means is arranged for causing each of the transmission means to transmit the message substantially simultaneously on the respective different transmission frequencies.

The present invention further provides a two-way communication system for relaying a message over a wide area. The system includes a plurality of fixed transmission means, each fixed transmission means having a coverage area and being arranged for transmitting radio frequency signals on a plurality of different transmission frequencies, control means for causing each fixed transmission means to transmit the message on a respective different transmission frequency, portable receiving means located within the coverage areas, each portable receiving means being arranged for receiving on all of the transmission frequencies, and each fixed transmission means further including receiver control means for causing each portable receiving means within its coverage area to tune to its transmission frequency.

The present invention further provides a method of relaying a message substantially simultaneously from a plurality of fixed location sites. The method includes the steps of providing each site with radio frequency transmission means capable of transmitting on a respective different plurality of frequencies than the transmission frequencies of any other of the sites, selecting among the plurality of frequencies at the sites to provide corresponding channels at each of the respective sites, setting at least two of said transmission means to different respective transmission frequencies corresponding to a given one of the channels, and transmitting the message from the set transmission means.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DESCRIPTION OF THE PREFERRED EMBODIMENTS

Figure 1:
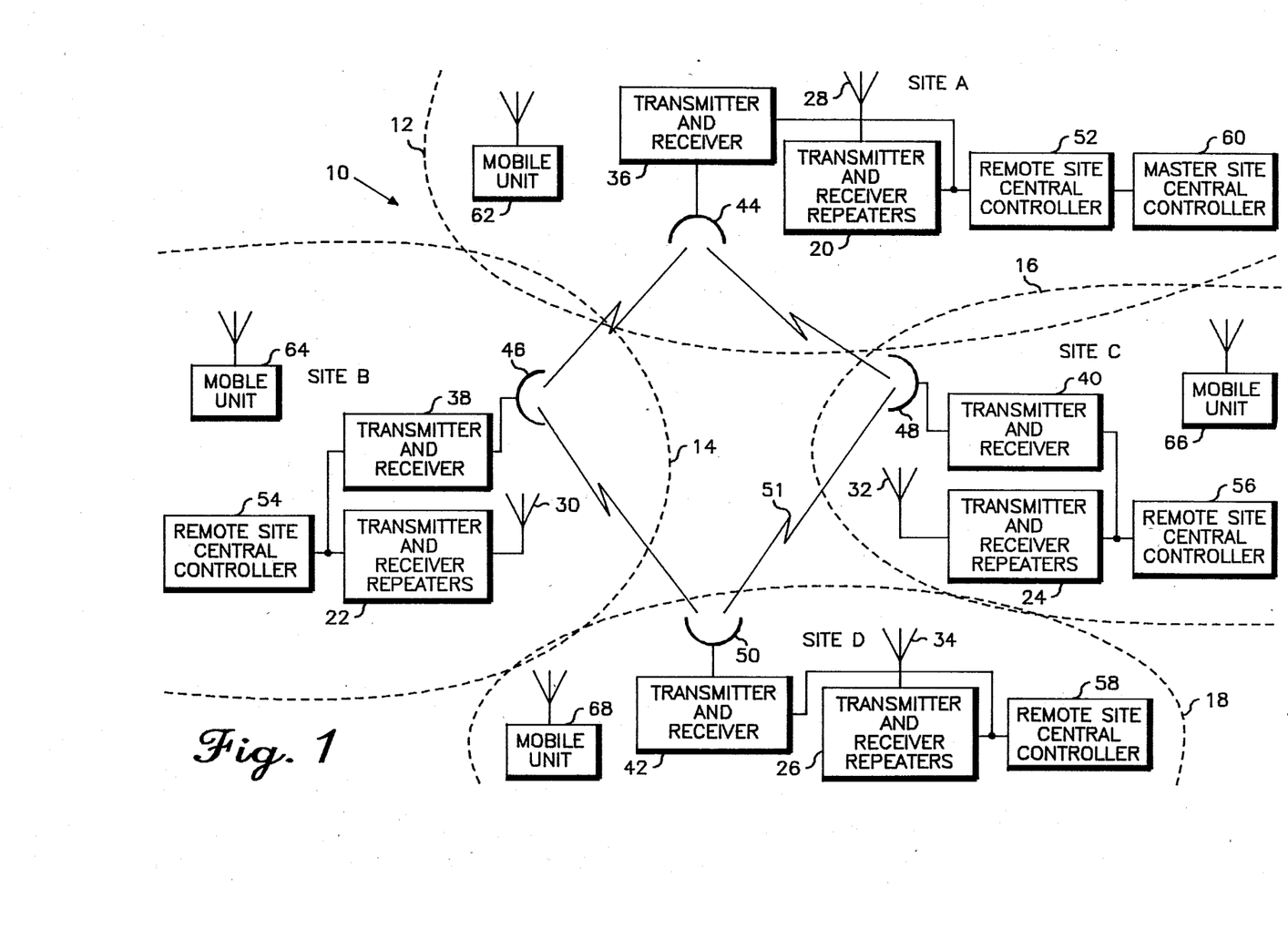
FIG. 1 is a schematic representation of a wide coverage area communication system embodying the present invention.

Referring now to FIG. 1, it illustrates in schematic form a wide coverage area communication system 10 embodying the present invention. The system includes a plurality of fixed transmitting and receiving sites designated as site A, site B, site C, and site D. Each of the sites has a coverage area indicated by dashed lines with site A having coverage area 12, site B having coverage area 14, site C having coverage area 16, and site D having coverage area 18. The sites are so located that radio transmission from and radio reception to each of the sites is limited to an essentially unique geographic area. Overlap between sites may be non-existent or may be total depending upon the local terrain or topography of the geographical area to be covered. For purposes of this embodiment it is assumed that the coverage area of any one site overlaps that of two others so that an entire area of continuous coverage is established.

Each of the fixed sites A, B, C, and D includes radio frequency transmitting and receiving means in the form of transmitter and receiver repeaters 20, 22, 24, and 26 respectively. Each of the transmitter and receiver repeaters has a fixed antenna 28, 30, 32, and 34. Each of the repeaters 20, 22, 24, and 26 is arranged for transmitting and receiving on a respective different group of frequencies, with each repeater being assigned a predetermined number of duplex channels, for example five channels, four channels being for system communication, and the fifth channel being used as a control channel. The transmitting and receiving frequencies of the repeaters are also grouped together so that a transmission frequency of one repeater finds three corresponding but different transmission frequencies with the other repeaters.

Each of the sites also includes a microwave transmitter and receiver terminal 36, 38, 40, and 42. Each of the transmitter and receiver terminals 36, 38, 40, and 42 has an associated microwave antenna 44, 46, 48, and 50 respectively. The microwave transmitter and receivers and the microwave antennas provide a microwave communication link 51 between the various sites. Alternatively, a land line could be provided for performing this function.

Each of the sites includes a remote site central controller 50, 52, 54, and 56. Each remote site central controller controls the local operation of its respective site and provides for communication from its site back to a master control site, for example, site A in this embodiment. To that end, site A also includes a master site central controller 60. The master site central controller 60 serves as a control means for the entire system and supervises and controls the activities of all sites in the system.

Lastly, located within the coverage areas of the sites are mobile units or portables herein after, mobiles, 62, 64, 66, and 68. Each of the mobile units, which may vary in total number, and vary in the number within a individual site coverage area, includes a low power transmitter capable of transmitting on any one of the communication channels and any one of the control channels, and a receiver for receiving on any one of the communication or control channels. The mobile units can be related to each other by an automatic grouping bf the mobile units into groups of users who must communicate with each other.

Before the rest of the system is described in greater detail, it may be helpful to follow the progression of a call made on the system 10 of FIG. 1. Each mobile unit has a storage device which, among other information, contains its individual identity, a grouping and subgrouping of other units with which the user can selectively communicate, and a listing of control channels which are in use at each site of the system. For a more complete description of such a storage device, reference may be had to U.S. Pat. Nos. 4,012,597 or 4,312,070 which are assigned to the assignee of the present invention. The mobile units further include equipment which causes its receiver to scan the outbound, or fixed-site transmit frequencies associated with the control channels until a suitably error free data signal is received. The mobile unit stops searching and remains on this control channel outbound frequency until commanded to tune to another frequency or until the data signal degrades to an unusable level at which time the control channel scan resumes.

All mobile equipment not engaged in an active call remain tuned to the control channel of the site in the coverage area that it is located in. When a wide area call is selected by a mobile unit and a request for service is initiated by the user activating the mobile transmitter, the mobile transmitter transmits request to the remote central controller in its coverage area on the inbound control channel frequency. This request contains the identity of the mobile equipment and group of mobile equipment being called. It also contains the type of service required, for example, in this instance, a wide area coverage call.

Assuming that mobile unit 66 in coverage area 16 of site C initiates a request for service, the request is received by the fixed site control channel receiver within the transmitter and receiver repeaters 24 and passes to the remote central controller 56 for interpretation. Since this is a wide area call, the request is relayed by the microwave transmitter and receiver 40 and antenna 48 over the microwave link 51 to the master site transmitter and receiver 36 and then to the master central controller 60 which monitors the activity of all system channels available for the wide area call. The master site central controller 60 assigns a channel at each site in the system for this wide area call and instructs each of the remote central controllers 52, 54, 56, and 58 to transmit a channel assignment instruction addressed to the mobile units or the group of mobile units requested by the caller. Following the channel assignment instruction, the demodulated audio received from the calling mobile unit 66 is relayed by the microwave link from site C to site A where the master central controller 60 is located. The audio is then distributed to the other sites by the microwave link 51 for simultaneous retransmission to the called mobile equipment on a respective different frequency at each of the sites.

The called mobile equipment are tuned to the control channel selected in the scanning mode. Upon detecting an instruction on the control channel addressed to itself, the called mobile units follow the instruction and tune to the frequency listed in the instruction. On this frequency, the called mobile equipment user receives the message originated by the calling mobile unit 66.

Upon the completion of the transmission by the calling mobile unit 66, the master site controller 60 is informed of the end of transmission and subsequently instructs the remote central controllers 52, 54, 56, and 58 to deallocate the wide area channels. Each remote central controller sends an instruction to the mobile equipment in its coverage area monitoring the message channel to retune to its respective different control channel. Once the channel is cleared in each site, the remote central controller of each site notifies the master site central controller 60 by the microwave link 51 that the channel has been cleared. The master site central controller 60 is then free to reassign the channels as desired for another wide area call request.

Figure 2:
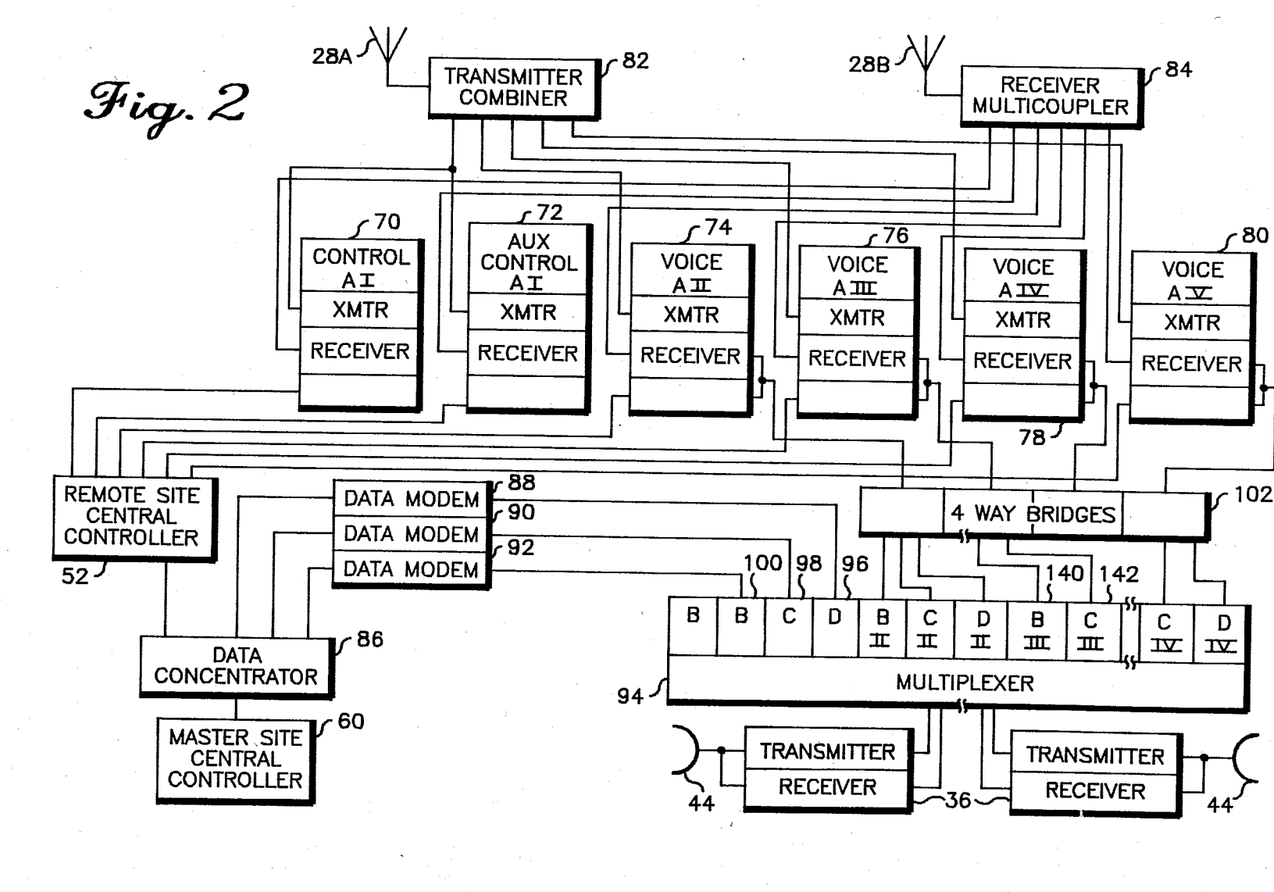
FIG. 2 is a block diagram of the fixed site identified as site A in FIG. 1 and which embodies the present invention.

Referring now to FIG. 2, it illustrates in greater detail the equipment at the master site, site A. The master site includes six repeaters 70, 72, 74, 76, 78, and 80 which comprise the transmitter and receiver repeaters 20 illustrated in FIG. 1. Associated with the repeaters is a transmitter combiner 82, such as a Phelps Dodge TJD 800-5T, and a receiver multicoupler 84, such as a Phelps Dodge RMC 800-8N. The transmitter combiner is coupled to a transmitting antenna 28a and the receiver multicoupler is coupled to a receiving antenna 28b. Four of the repeaters, repeaters 74, 76, 78, and 80 comprise message channel repeaters which are trunked for providing voice communication to the mobile units. The remaining two repeaters, repeaters 70 and 72 are used for system control of the mobile units. The master site A further includes the remote site central controller 52, such as a T1958 manufactured by Motorola, Inc. which controls the operation of the fixed radio equipment such as the repeaters and communicates with the mobile unit logic systems by the radio control channel repeaters 70 and 72. Repeater 72 comprises a standby repeater which can be utilized when repeater 70 is not operational, such as, when it is being serviced. The master site A further includes the master site central controller 60 which is coupled to and buffered by a data concentrator 86 which can be, for example, a QRN 6887A manufactured by Motorola, Inc.. The master site central controller 60 performs higher level system control functions. Data communication between the master site central controller 60 and the remote fixed sites is provided by data modems 88, 90, and 92 which are connected to three multiplex channels of a multiplexer 94. More particularly, data modem 88 is coupled to multiplexer channel 96, data modem 90 is coupled to multiplexer channel 98, and data modem 92 is coupled to multiplexer channel 100. The base band output of multiplexer 94 is fed to the microwave terminal 36 for transmission to the other remote fixed sites. A four-way bridge 102 is provided to distribute a common audio signal to each remote site through the multiplexer 94 and microwave terminal 36.

Each of the repeaters 70, 72, 74, 76, 78, and 80 includes a transmitter which is coupled to the transmitter combiner 82, and a receiver which is coupled to the receiver multicoupler 84. As indicated, the repeaters are arranged for operating on five different channels. Each channel is indicated with a roman numeral. Hence, the master site A transmitting equipment is arranged for transmitting on channels AI through AV.

Figure 3:
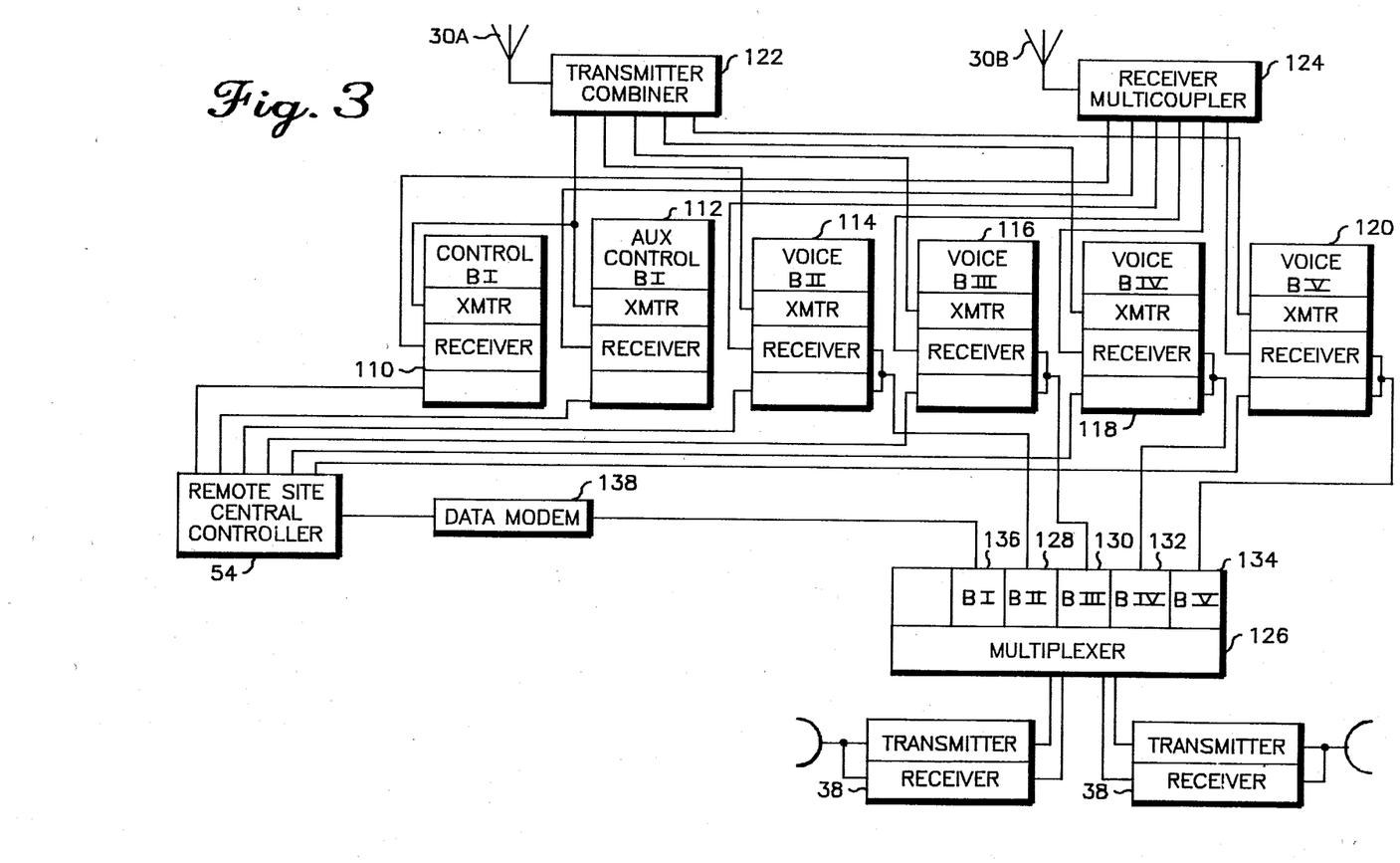
FIG. 3 is a block diagram illustrating a representative one of the other fixed sites of the system of FIG. 1 embodying the present invention.

Referring now to FIG. 3, it illustrates the equipment found at one of the remote sites, and more particularly, at remote site B. This is typical of any of the remote sites.

The site B includes six repeaters as does site A, namely, repeaters 110, 112, 114, 116, 118, and 120. Repeaters 110 and 112 are the control channel repeaters with repeater 112 serving as a standby repeater. In accordance with this preferred embodiment, the bridge 102 allows each message channel at each site to share a common audio input with one other message channel at each other site when a simultaneous transmission of a message by every channel within the common audio grouping is desired. Consequently, a message channel for group II, group III, group IV, and group V is found at remote site B. Each site has one message channel of each group. Control channels are herein designated as group I but cannot share a common audio input. Each of the repeaters 110, 112, 114, 116, 118, and 120 includes a transmitter section which is coupled to a transmitter combiner 122, and a receiver section which is coupled to the receiver multicoupler 124. The transmitter combiner 122 is coupled to a transmitting antenna 30a and a receiver multicoupler is coupled to receiving antenna 30b. The receivers of the message repeaters 114, 116, 118, and 120 are also coupled to the multiplexer 126 and more specifically to channels 128, 130, 132, and 134 respectively. To provide local control of site B and communication with the master site central controller 60, remote site B includes the remote site central controller 54 which is coupled to a multiplexer channel 136 by a data modem 138. The multiplexer 126 couples the remote site central controller and the message repeaters to the microwave terminal 38.

Now that the system 10 as illustrated in FIG. 1 and the portions thereof illustrated in FIGS. 2 and 3 have been described in general detail, a specific call process will now be described. It is assumed that each of the mobile units 62, 64, 66 and 68 have locked their receiver and transmitter to the control channel frequency of sites A, B, C, and D respectively. If mobile unit 66 drives out of the coverage area 16 of the transmitter 24 in site C and into the coverage area of the transmitter 26 within site D, the data transmitted on the control channel of site C will become increasingly deteriorated by noise until it becomes unusable. When a predetermined digital error rate is reached, the mobile unit 66 will cause its receiver to sequentially tune to the other control channels of the sites in the system. The frequencies of the control channels are stored in a storage device in the logic system of the mobile unit 66 equipment. When the receiver within mobile unit 66 receives the control channel signal of site D, the logic system within mobile unit 66 determines that the transmitted data is acceptably error free and causes the receiver within mobile unit 66 to cease scanning and remain on the control channel of site D. Mobile equipment of this type is more specifically described in the aforementioned U.S. Pat. Nos. 4,012,597 and 4,312,070.

If the user within mobile unit 62 wishes to make a wide area call to members of his previously established group which may, for example, include mobile units 64 and 68, he selects the wide area coverage feature in his mobile equipment and activates his transmitter by pressing a push-to-talk button on his transmitter. This causes the transmitter within mobile unit 62 to transmit a data word to the remote central controller 52 via the receiving antenna 28b, the receiver multicoupler 84, and the receiver of control channel repeater 70. The remote central controller 52 interprets the call type as a wide area coverage group call and extracts the called group identification from the calling unit identification. The remote central controller 52 then forwards the request to the master site central controller 60 via the data concentrator 86.

The master site central controller 60 is informed of the availability of channels from the remote central controllers 52, 54, 56, and 58 via the microwave link 51, the receiver of microwave terminal 36, channels 100, 98, and 96 of multiplexer 94, the data modems 88, 90, and 92, and the data concentrator 86. As previously mentioned, the communication channels in accordance with this preferred embodiment, are grouped into five groups. Group I includes all the control channel repeaters and standby equipment of each site. This group includes repeaters 70 and 72 of site A as illustrated in FIG. 2, repeaters 110 and 112 of site B as illustrated in FIG. 3, and equivalent repeaters for sites C and D. Group II includes one message channel repeater from each site and is represented, for example, by repeater 74 of site A and repeater 114 of site B. Group III includes one message channel repeater from each site including repeaters 76 and 116. Similarly, Group IV includes repeaters 78 and 118, and Group V repeaters include repeaters 80 and 120. Also as previously mentioned, each repeater operates on a unique and discrete frequency duplex pair.

The master site central controller 60 through an internal comparison algorithm recognizes that the message channels of Group III, for example, are unutilized and selects this channel group for the message of mobile unit 62 to be simultaneously relayed from the fixed sites A, B, C, and D. The master site central controller 60 then transmits instructions to each remote site central controller 52, 54, 56, and 58 to transmit on its respective control channel to each mobile unit in the called group. The master site central controller 60 sends the instruction to the site A remote central controller 52 directly from the master site central controller 60 to the data concentrator 86 and to the remote site central controller 52. The other sites require the microwave link 51 to receive its instruction. Therefore, the output of the data concentrator 86 for sites B, C, and D passes through the data modems 88, 90, and 92 for conversion for transmission through the multiplex channels 100, 98, and 96 of multiplexer 94 and transferred to the microwave link 51 through the microwave terminal 36 and its antennas 44. At remote site B, illustrated in FIG. 3, the base band of the transmitted microwave signal is demodulated by the microwave terminal 38 and multiplex channel 136. The demodulated signal is demultiplexed by multiplexer 126. The recovered information is passed to data modem 138 for conversion to a digital format and presented to the remote site B remote site controller 54. The remote site controller 54 transmits a data word on the site B control channel via repeater 110 and transmitter combiner 122 to any and all mobile units with a group identification like the calling mobile unit 62 which happen to be within the coverage area of remote site B. A similar process occurs in sites C and D.

In site B, the equipment within mobile unit 64 detects and recognizes the group identification of the outbound data word as its own and decodes the remainder of the data word to establish the message channel to which it should tune its receiver and transmitter. As a result, the control means or master site controller 60 has caused the mobile equipment of mobile unit 64 within site B to set its receiver and transmitter to the proper frequency for receiving the wide area coverage transmission. The equipment within mobile unit 64 tunes to the message channel of site B which corresponds to the Group III message channel for receiving the relayed or retransmitted message of mobile unit 62. A similar sequence of events occurs for mobile unit 68 and all other mobile units within the designated group. For mobile units of dissimilar groups, such as mobile unit 66 within site C coverage area, transmission on the control channels are ignored and the mobile units of dissimilar identification remain tuned to their respective control channels.

Mobile unit 62, which is the calling mobile unit, is given a message channel assignment of the Group III channel at site A by the remote site controller 52 through control channel repeater 70 and transmitter combiner 82. The process typically takes less than one second and occurs in such a manner that the user is unaware of the process. The user of mobile unit 62, to initiate his call, had pressed and held a push-to-talk button during the brief system access time and began his conversation on the assigned message channel. His voice is modulated on the RF carrier of the mobile equipment transmitter of mobile unit 62 and transmitted to the site A Group III message channel receiver of repeater 76 via the receiver multicoupler 84. The users audio is demodulated in the receiver of repeater 76 and, in response to a command from remote site controller 52, is coupled to the four-way bridge 102 where the audio is split three ways. These three outputs are connected to multiplex channels 140 corresponding to channel III-B, channel 142 corresponding to channel III-C, and the channel corresponding to III-D of multiplexer 94. The base band output of multiplexer 94 is modulated on a microwave RF carrier at the microwave terminal 36 and transmitted by antennas 44 over the microwave link 51 to the remote sites B, C, and D.

At site B, which is representative of the other remote sites, the microwave terminal 38 demodulates the base band of the microwave signal and couples it to the multiplexer 126 for separation of multiplex channel III-B from the base band. The demodulated audio is coupled to the message channel repeater 116 where, according to an instruction from remote site controller 54, the audio is modulated on an RF carrier for transmission to mobile unit 64 and others in the same grouping within the coverage area of remote site B. Mobile unit 64 and others in the same grouping receive this transmission and demodulate the RF carrier for the users to hear the message.

When mobile unit 62 completes his transmission, the push-to-talk switch is released. This causes the equipment within mobile unit 62 to transmit an end-of-transmission signal for the system to deallocate the message channels. Other methods of detecting an end-of-transmission can be used such as a lack of radio frequency carrier emitted from the mobile equipment, a lack of information modulated on the carrier, or a time-out period expiration. This signal is received on the message channel of Group III by message channel repeater 76 and is coupled to remote site central controller 52. The end-of-transmission signal is detected within the remote site central controller 52 and this detection is transferred to the master site central controller 60 via the data concentrator 86. The master site central controller 60 interprets this detection as the need to deallocate all of the Group III message channels. The master site central controller 60 sends a deallocation instruction to each remote site central controller via data concentrator 86. The site A remote site central controller 52 receives this instruction directly while the site B, C, and D remote central controllers 54, 56, and 58 receive the instruction via the data modems 88, 90, and 92, multiplex channels 100, 98, and 96 of multiplexer 94 and microwave terminal 36.

In response to the deallocation instruction, the remote site central controller acknowledge the instruction to check for error. If no response from the master site central controller 60 is received, the remote site central controller 52 composes a data message instructing mobile unit 62 (and other mobile units of the same group within the coverage area of site A) to retune its receiver and transmitter to the control channel of site A. This data message is sent from the remote site central controller 52 to the Group III message channel repeater 76 for modulation at the transmitter and transmission to the mobile units via transmitter combiner 82. Upon receiving this data message, mobile unit 62 and others retune to the control channel of site A.

Remote sites B, C, and D are similar in operation. As a result, the operation of site B will be described. The deallocation data message is received via microwave terminal 38, passed to the multiplexer 126 where channel B is separated from the base band and passed through the data modem 138 to remote site central controller 54. An acknowledgment is returned to the master site central controller 60 via the same data channel. If no message is returned, remote site central controller 54 composes a data message for mobile unit 64 and other mobiles of the same group which instructs them to retune their receivers and transmitters to the site B control channel. This data message is coupled to the Group III message channel repeater 116, modulated on the RF carrier of the transmitter section thereof, and coupled through the transmitter combiner 122 for transmission to mobile unit 64 and others. Upon reception, mobile unit 64 and return their receivers and transmitters to the control channel of site B.

When remote site central controller 54 completes the process of transmitting the deallocation data message, it reports to the master site central controller 60 via the data modem 138, multiplexer 126, microwave terminal 38, microwave terminal 36, multiplexer 94, data modem 92, and data concentrator 86 that the Group III message channel in site B is clear. With this notification from site B and the other remote sites C and D, the master site central controller 60 recognizes that the Group III message channels are available for reassignment.

Figure 4:
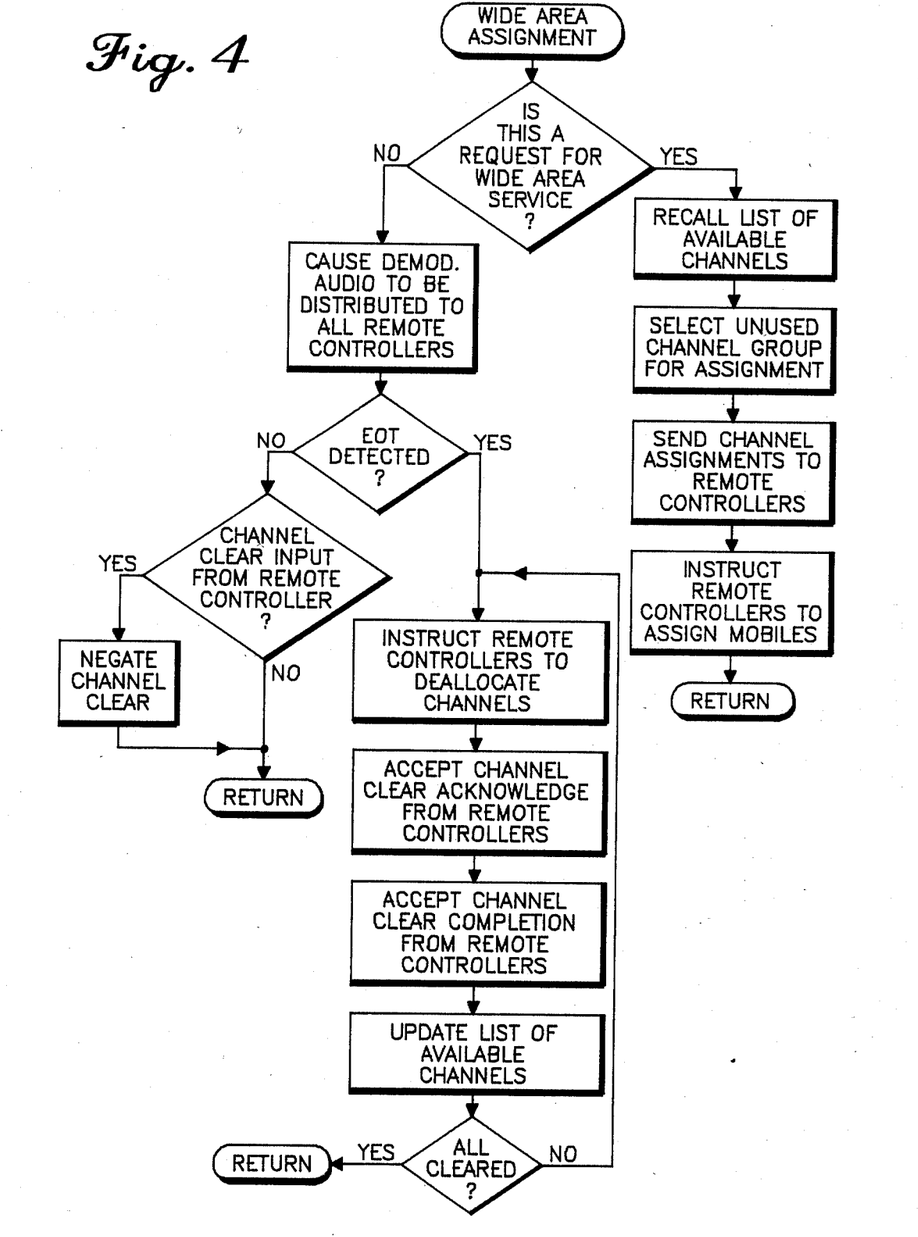
FIG. 4 is a flow chart illustrating the operation of the master site controller 60 of FIG. 2.

Referring now to FIG. 4, it shows a flow diagram illustrating the operation of the master site controller 60 of FIG. 2. As will be noted, the master site central controller first determines whether a call request is for wide area service. If the answer is yes, then the master site controller recalls the list of available channels. It then selects an unused channel group for assignment. The master site controller then sends channel assignments to the remote site controllers and instructs the remote site controllers to assign the selected channels to the mobile units. Thereafter, the master site central controller returns.

If the answer to the original question was no, the master site controller then causes demodulated audio to be distributed to all remote site controllers. If the demodulated audio is detected, then the master site controller instructs the remote site controllers to deallocate their channels. The master site controller then accepts a channel clear acknowledgment from the remote site controllers and channel clear completion from the remote site controllers. The master site controller then updates the list of available channels and then determines if all of the available channels are cleared. If they are cleared, then the master site controller returns. If they are not cleared, the master site central controller then once again enters the sequence of instructing the remote site controllers to deallocate their channels.

If the demodulated audio distributed to all of the remote site controllers is not detected, then the master site central controller determines whether it has received a channel clear input from the remote site controllers. If the answer is yes, it negates a channel clear and if the answer is no it returns.

The present invention therefore provides a new and improved system and method for wide coverage area radio communication. Because each of the repeaters of the remote fixed sites are arranged for transmitting and receiving on a respective different frequency duplex frequency pair or channel, the problems encountered in the past with overlapping remote site coverage areas are avoided. More specifically, radio frequency carrier heat note interference and demodulated audio phase cancellation are avoided. Further, because access of the system is controlled by a centralized control means in a trunking manner, equal access of the system to many potential users is provided.

I claim:

1. In a two-way communication system of the type adapted to relay a message substantially simultaneously between a plurality of fixed location sites having corresponding radio coverage areas, the improvement comprising:
   radio frequency transmission means at each of said sites arranged for transmitting on a respective different plurality of frequencies than the transmission frequencies of any other of said sites;
   means coupled to each said radio frequency transmission means for selecting among the pluralities of different frequencies at said sites to provide corresponding channels at each of said sites whereby said message may be relayed between said sites; and
   control means for selecting one of said channels and causing at least two of said transmission means to transmit said message substantially simultaneously on respective selected different frequencies.

2. A system as defined in claim 1 wherein said control means is arranged for causing each of said transmission means to transmit said message substantially simaltaneously on said respective selected different transmission frequencies coupled to said selected channel.

3. A system as defined in claim 1 wherein said control means is located at one of said fixed sites.

4. A system as defined in claim 1 further including at least two remote receiving means for receiving said relayed message, each said remote receiving means being located in the radio coverage area of a corresponding one of said fixed transmission means and wherein said control means includes means for causing each said remote receiving means to tune to the transmission frequency of its corresponding fixed transmission means for receiving said message.

5. A system as defined in claim 1 wherein said pluralities of message transmission frequencies are predeterminedly arranged in groups consisting of one said respective different transmission frequency of each of the fixed transmission means.

6. A system as defined in claim 5 wherein said control means includes means for causing said transmission of said message on one said groups of respective different frequencies in response to said one of said groups of frequencies being unoccupied.

7. A system as defined in claim 1 wherein said means for selecting among the pluralities of different frequencies further comprises a microwave communications link.

8. A system as defined in claim 1 further including means for receiving the message at one fixed site and communicating the message via said selected channel to all of said fixed sites.

9. A two-way communications system for relaying a received message over a wide coverage area, said system comprising:
a plurality of fixed sites, each site having a site coverage area comprising part of the wide coverage area, each site having a plurality of transmitters timed to different transmission frequencies, and each site having coupling means to couple each site transmitter to a predetermined group of transmitters, said group having one transmitter situated at each other site and each transmitter within said group tuned to a different transmission frequency;
control means for causing one of said transmitter groups to transmit said received message in response to all transmitters being unused within said group;
at least two remote receiving means located within said wide coverage area, each said remote receiving means being arranged for receiving on all transmission frequencies; and
each said fixed site further including receiver control means for causing each said remote receiving means within a site coverage area to tune to its transmission frequency employed by its corresponding transmitter within said group of message transmitting transmitters.

10. A system as defined in claim 9 wherein said receiver control means of each said fixed site is responsive to said control means.

11. A system as defined in claim 9 wherein said control means is located at a given one of said fixed site.

12. A system as defined in claim 9 wherein each said transmitter is coupled via a microwave link to at least one other transmitter in its group.

13. A method of relaying a message substantially simultaneously between a plurality of fixed location sites, said method comprising the steps of:
providing each said site with radio frequency transmission means capable of transmitting on a respective different plurality of frequencies than the transmission frequencies of any other of said sites;
selecting among the pluralities of frequencies at said sites to provide corresponding channels at each of said respective sites;
selecting one corresponding channel from among said corresponding channel to relay said message between said sites; and
causing at least two of said transmission means to transmit said message substantially simultaneously on said selected plurality of frequencies.

14. A method as defined in claim 13 including the step of setting a plurality of portable receivers to the transmission frequencies of said transmission means.

15. A method as defined claim 14 wherein each of said transmission means has a corresponding coverage area, and wherein said method further includes providing a plurality of portable receiving means capable of being tuned to said transmission frequencies; and
tuning at least one said portable receiving means to the transmission frequency of the transmission means corresponding to the area of coverage in which each said portable receiving means is located.

16. A method as defined in claim 13 including the further step of distributing said message to be relayed from a given one of said transmission means to all of the other transmission means.

17. A method as defined in claim 13 including the further step of arranging said transmission frequencies of said transmission means in groups so that each transmission frequency of one said transmission means corresponds to a respective different transmission frequency of each of the other transmission means.

18. A method as defined in claim 17 including the further step of detecting which transmission frequencies are unoccupied, and wherein said message is transmitted in response to all of the frequencies of one of said groups of frequencies being unoccupied.

19. A method as defined in claim 13 including the further step of detecting which of the transmission frequencies is unoccupied, and causing said message to be transmitted when all the transmission means have an unoccupied respective different transmission frequency.

20. A two-way radio communications system for a large geographic area in which a plurality of geographically spaced apart fixed sites having separate radio coverage areas are employed to extend radio coverage over the large geographic area and transmit a message within the large geographic area comprising:
at least two means at each fixed site for transmitting radio frequency (RF) signals, each RF signal at a fixed site having a frequency different from any other at the same fixed site;
means for grouping said transmitting means into channels, each channel comprising one said transmitting means from each fixed site and each channel employing dissimilar RF signal frequencies among its group of transmitting means; and
means for selecting one of said channels having its group of transmitting means unoccupied, and for routing the message to each fixed site whereby transmission may occur essentially simultaneously from each said transmitting means of said selected channel.

21. A two-way radio system in accordance to claim 20 further comprising means for distribution of the message between fixed sites on said selected channel.

22. A two-way radio system in accordance to claim 21 wherein said means for distributing a channel is a microwave link.

23. A two-way radio system in accordance with claim 20 further comprising a plurality of mobile units to at least one of which the message is directed.

24. A two-way radio system in accordance with claim 23 further comprising means for assigning each mobile unit to which the message is directed to one of said RF signal frequencies corresponding to said selected channel whereby the message may be received.

25. A two-way radio system in accordance with claim 23 wherein the message is generated by a second one of said plurality of mobile units.

26. A two-way radio system in accordance with claim 25 further comprising means, located at each fixed site, for receiving said mobile unit generated message.

* * * * *

UNITED STATES PATENT AND TRADEMARK OFFICE
CERTIFICATE OF CORRECTION

PATENT NO. : 4,578,815
DATED : Mar. 25, 1986
INVENTOR(S) : Gary W. Persinotti

It is certified that error appears in the above-identified patent and that said Letters Patent is hereby corrected as shown below:

Claim 2, line 64, "simaltaneously" should be --simultaneously--.

Claim 9, line 33, "timed" should be --tuned--.

Claim 15, line 13, "as defined claim" should be "as defined in claim".

Signed and Sealed this

Twelfth Day of August 1986

[SEAL]

Attest:

DONALD J. QUIGG

Attesting Officer

Commissioner of Patents and Trademarks